April 14, 1942.   A. C. McCRUM   2,279,949
METHOD OF MAKING LABELS
Filed Feb. 19, 1940   5 Sheets-Sheet 1
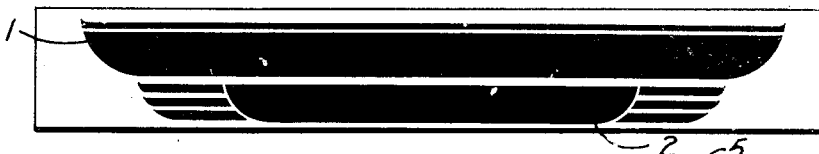
Fig. 1.
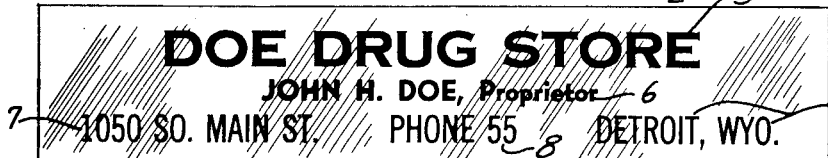
Fig. 2.
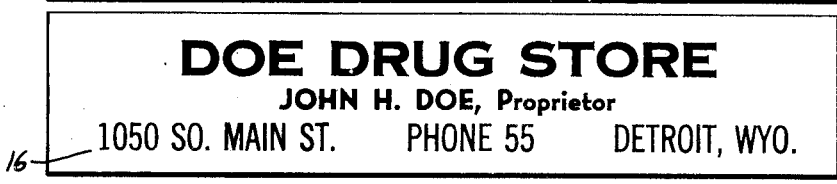
Fig. 3.
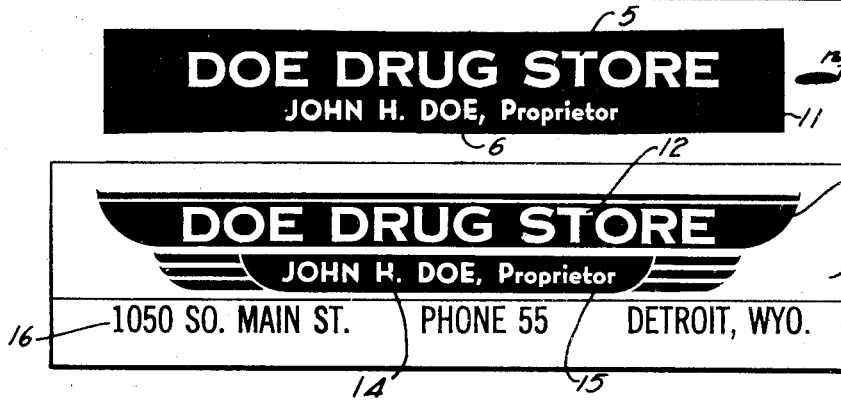
Fig. 4.
Fig. 5.
Fig. 6.
Fig. 7.
Fig. 8.
Fig. 9.
INVENTOR
Arthur C. McCrum
BY
ATTORNEY April 14, 1942.  A. C. McCRUM  2,279,949
METHOD OF MAKING LABELS
Filed Feb. 19, 1940  5 Sheets-Sheet 2
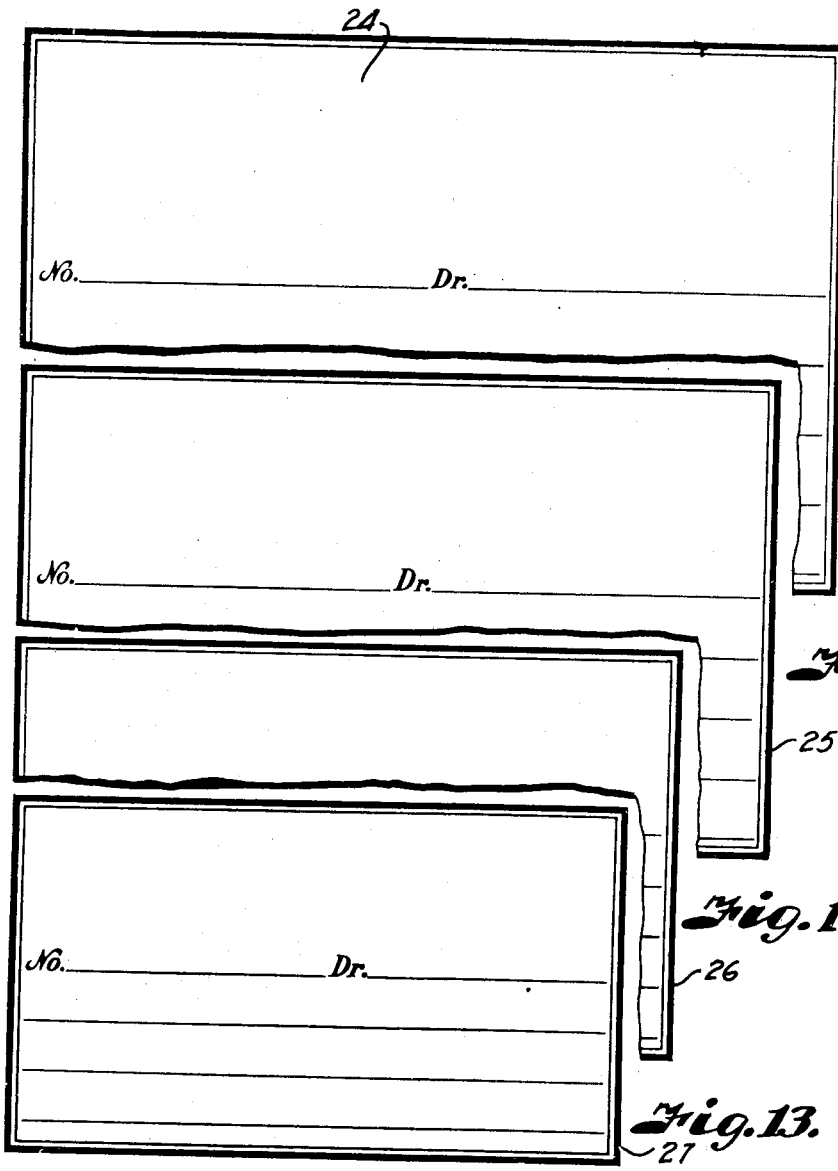
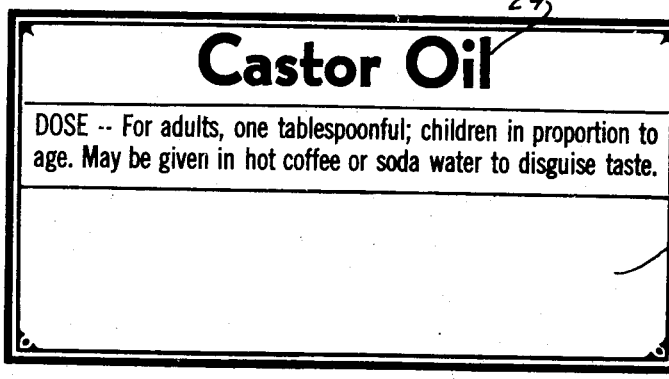
INVENTOR
Arthur C. McCrum.
BY
ATTORNEY April 14, 1942. A. C. McCRUM 2,279,949
METHOD OF MAKING LABELS
Filed Feb. 19, 1940 5 Sheets-Sheet 3
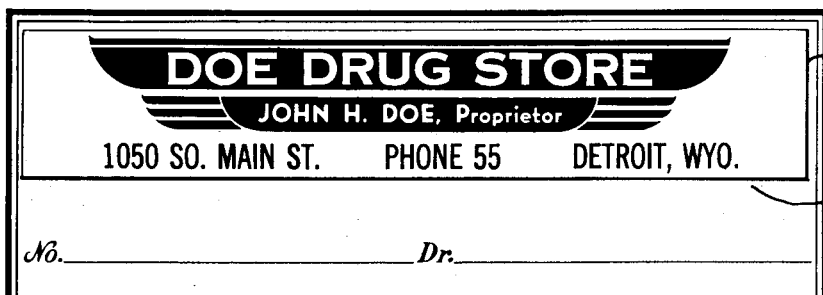
Fig. 15.
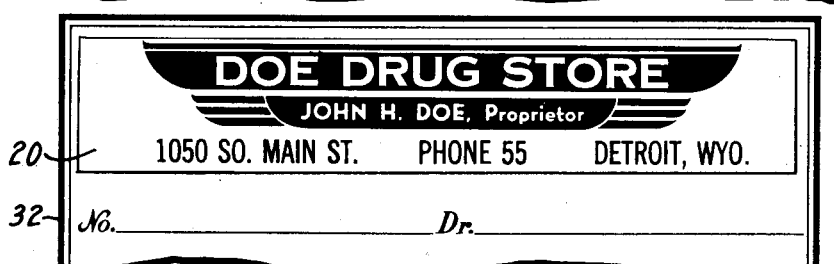
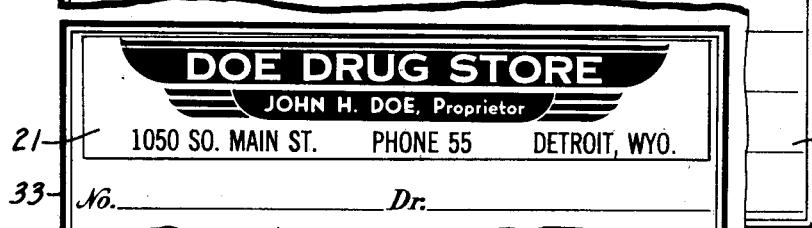
Fig. 16.
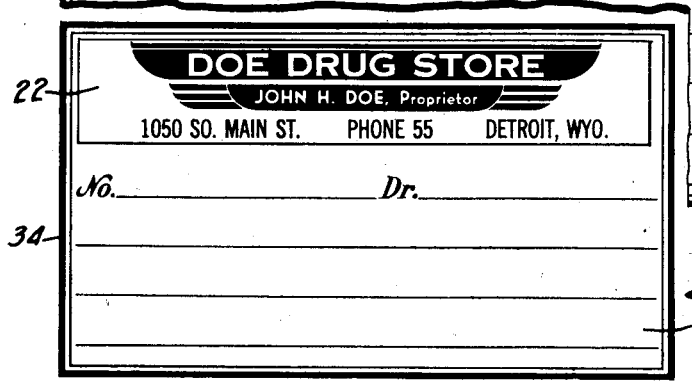
Fig. 17.
Fig. 18.
Fig. 19.
INVENTOR
Arthur C. McCrum.
BY
ATTORNEY April 14, 1942.  A. C. McCRUM  2,279,949
METHOD OF MAKING LABELS
Filed Feb. 19, 1940  5 Sheets-Sheet 4

INVENTOR
*Arthur C. McCrum.*
BY
ATTORNEY

April 14, 1942. A. C. McCRUM 2,279,949
METHOD OF MAKING LABELS
Filed Feb. 19, 1940 5 Sheets-Sheet 5
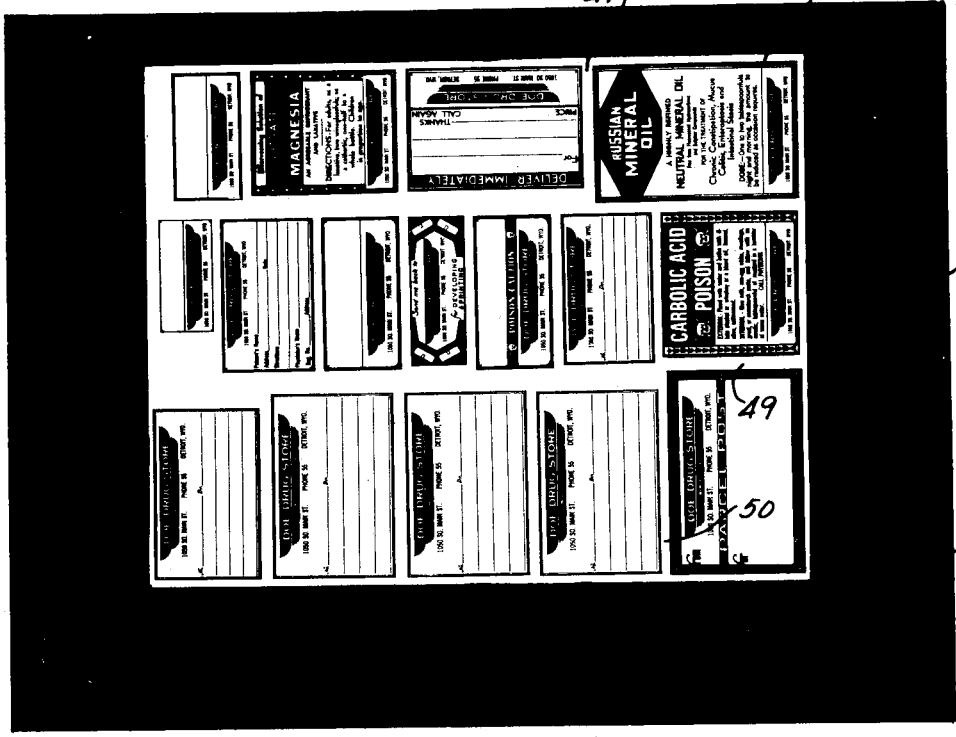
Fig. 21.
Fig. 22.
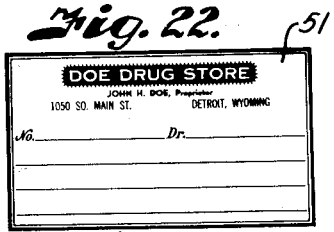
Fig. 23.
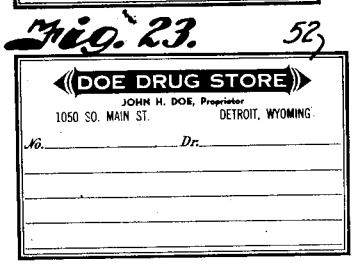
Fig. 24.
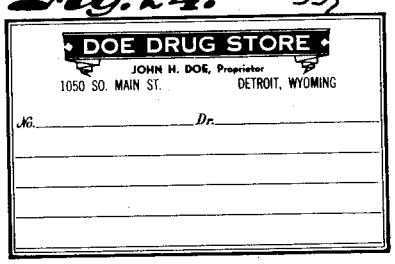
Fig. 25.
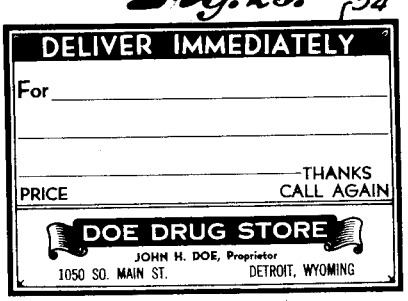
Fig. 26.
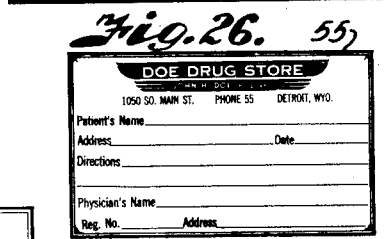
Fig. 27.
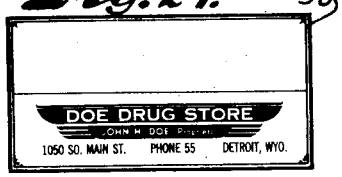
Fig. 28.
Fig. 29.
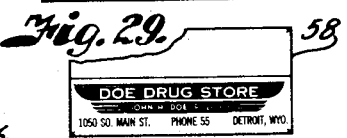
INVENTOR
Arthur C. McCrum.
BY
ATTORNEY Patented Apr. 14, 1942

2,279,949

UNITED STATES PATENT OFFICE 2,279,949

METHOD OF MAKING LABELS

Arthur C. McCrum, Kansas City, Mo.

Application February 19, 1940, Serial No. 319,606

3 Claims. (Cl. 95—5)

This invention relates to a method of making labels, and more particularly to a method of making druggist's gummed labels and the like in a rapid, accurate and economical manner; the principal objects of the invention being to provide a flexibility of design and an efficient method of producing said labels.

In the drug label making industry, two conventional methods of manufacture have heretofore been employed, namely, (1) the so-called "lithographic stone" process, wherein drug label designs are engraved on stone and then by a conventional transfer method are etched on stone or zinc plates, depending upon the style of press to be employed in printing the labels. By this "stone" process of producing drug labels, the high cost of making the necessary engravings for the different sizes of labels and the necessarily slow procedure of the above mentioned transfer method steps so increase the selling price of these labels, particularly in relatively small quantities, as to put them out of reach of the average or small retail druggist. (2) The "type" or "letter press" process, in which the high cost of "make-ready" and the high cost of distribution of type and material are out of proportion to the low selling price required for this class of labels and consequently result in little or no profit to the producer.

Further objects of my invention are, therefore, to satisfy the trade by conveniently making available a variety of attractive designs in proper sizes suitable for each label ordered; and to provide a rapid, accurate and economical method of producing labels at selling prices within the reach of the average or small retail druggist, while still providing a reasonable margin of profit for the producer.

In accomplishing these and other objects of the invention, and in carrying out my method, I employ apparatus and manipulative steps, the preferred arrangements of which are illustrated in the accompanying drawings, wherein:

Fig. 1 is a plan view of a primary card, showing a stock design for copy to be applied thereto, together with a blank space for additional copy and hereafter referred to as a "title-design."

Fig. 2 is a plan view of a type copy proof, "pulled" in black ink on transparent material and hereafter referred to as a "cello-proof."

Fig. 3 is a plan view of a type copy proof, "pulled" on white enamel paper and hereafter referred to as a "black-proof."

Fig. 4 is a plan view of a photographic contact print of the top portion of the "cello-proof," shown in Fig. 2, and hereafter referred to as a "contact print."

Fig. 5 is a plan view of the completed design, showing a combination of a "title-design," Fig. 1, a trimmed and pasted-on "contact print," Fig. 4, and a trimmed and pasted-on bottom line of the "black-proof," Fig. 3, to make a completed design hereafter referred to as a "paste-up title-design."

Fig. 6 is a plan view of a nine per cent (9%) photographic reduction print of the "paste-up title-design," Fig. 5.

Fig. 7 is a plan view of a fifteen per cent (15%) photographic reduction print of the "paste-up title-design," Fig. 5.

Fig. 8 is a plan view of a twenty-two per cent (22%) photographic reduction print of the "paste-up title-design," Fig. 5.

Fig. 9 is a plan view of a thirty-three per cent (33%) photographic reduction print of the "paste-up title-design," Fig. 5.

Figure 20:
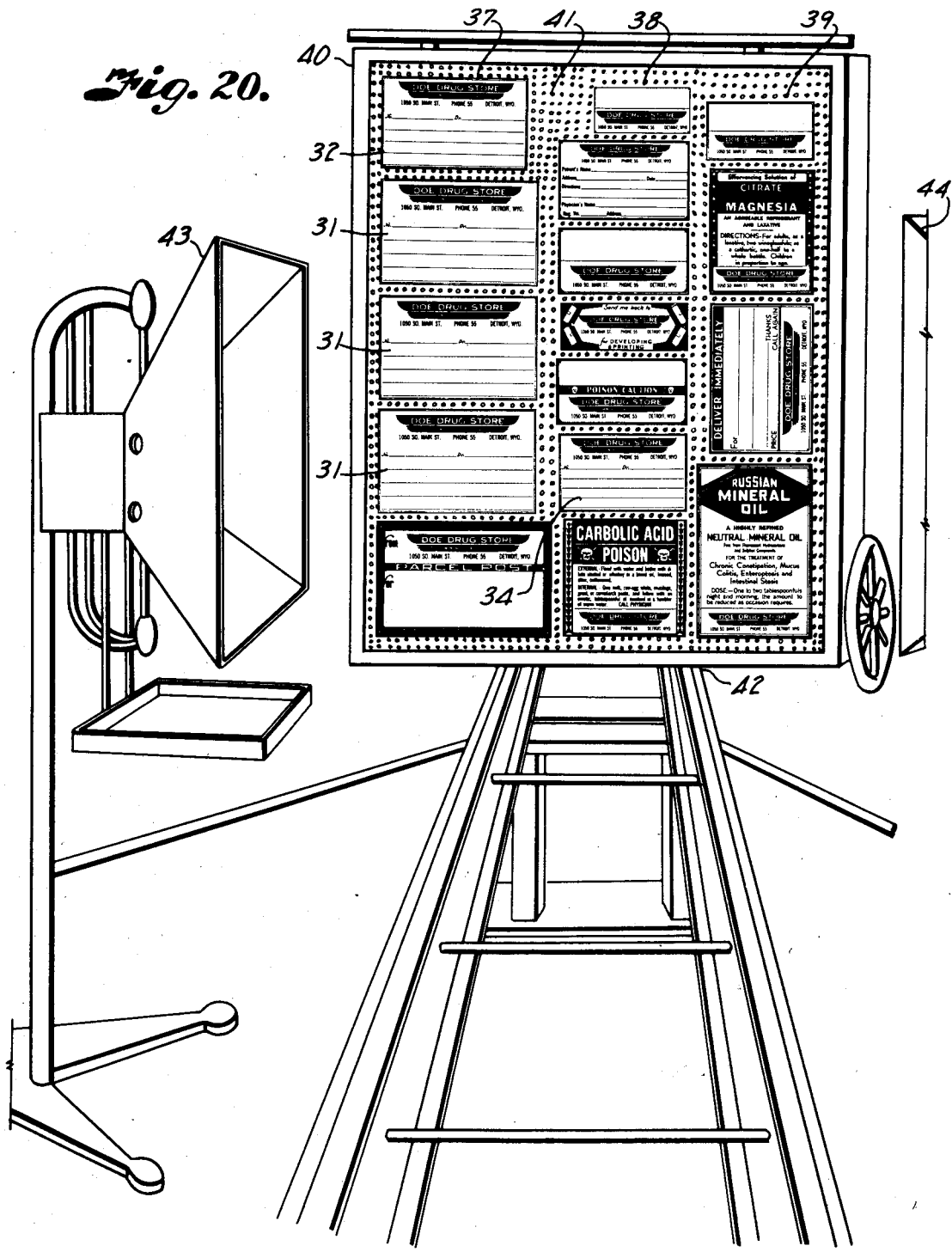

Figs. 10, 11, 12, 13, and 14, respectively, are plan views of illustrative "skeleton" forms adapted for employment as "title-designs," as shown in Figs. 6 to 9, inclusive, respectively, and hereafter referred to as "black-forms."

Figs. 15, 16, 17, and 18, respectively, are plan views of "black-forms" provided respectively with "title-designs," Figs. 6 to 9, respectively, pasted in proper position and hereafter referred to as "paste-ups."

Fig. 19 is a plan view of a "black-form," Fig. 14, with a "title-design," Fig. 3, pasted in proper position, and hereafter referred to as a "paste-up."

Fig. 20 is a view of a suitable camera copyboard, shown as supporting a group of individual "paste-ups."

Fig. 21 is a plan view of a piece of glass, the size of a press plate, with a portion, as shown, painted black. The illustration shows half a label form, or one group of negatives, arranged in rows and properly spaced, from which a press plate is made.

Figs. 22 to 29 are plan views of a group of labels, actual size, which are most frequently used by the average druggist, showing various designs.

Referring more in detail to the drawings in relation to the method:

1 and 2, Fig. 1, designate illustrations of a variety of blank designs having universal overall dimensions suitable for receiving druggist's copy, such as the druggist's firm name, address, telephone number, city, and State, the designs preferably being printed in black permanent ink on cardboard stock 3.

4, Fig. 2, designates a "cello-proof" which may be "pulled" from a suitable type form with opaque quick-drying black permanent ink, the "cello-proof" preferably consisting of a sheet of transparent material, such as "Cellophane," and bearing thereon copy, such as a druggist's firm name 5, a designation of proprietorship 6, an address 7, a telephone number 8, city and State designation 9.

10, Fig. 3, designates a type copy proof "pulled" on white enamel paper, as distinguished from the transparent material of the "cello-proof," Fig. 2, the so-called "black-proof," Fig. 3, bearing designations similar to and in the same arrangement as the designations of the "cello-proof," Fig. 2.

11, Fig. 4, designates a "contact print" bearing the name designations 5 and 6 of the "cello-proof" 4, Fig. 2, the "contact print" 11 preferably being made immediately upon completion of the "cello-proof" and in a conventional manner, as by exposing sensitized printing paper over the "cello-proof" followed by developing, washing, fixing, rinsing, and drying the contact print.

The "contact print" 11 is then trimmed and pasted in a "title-design," as shown in Fig. 5, the name designation 12 being placed in a design 13, similar to the design 1, Fig. 1, and the proprietorship designation 14, similar to the designation 6, Fig. 2, being placed on the design 15, Fig. 5, corresponding to the design 2, Fig. 1. The "black proofs" 11, Fig. 3, and particularly the lower portion 16 thereof bearing the address, telephone number, city, and State designations are trimmed and pasted under the title designs 12—13 and 14—15, as shown at 17, on suitable, preferably cardboard, stock 18 to complete the "paste-up title-design," Fig. 5. A "paste-up title-design," may be easily and rapidly constructed, and is economical to produce, yet is attractive in appearance and is easily read.

Photographic reductions are preferably next made of the completed "title-designs" shown in Fig. 5, preferably with the use of conventional dark room camera equipment and film, the reductions preferably being in the relation of nine per cent (9%), fifteen per cent (15%), twenty-two per cent (22%), and thirty-three per cent (33%) reductions of the completed "title-design" shown in Fig. 5 to produce films 19, Fig. 6; 20, Fig. 7; 21, Fig. 8; and 22, Fig. 9, respectively. The films 19 to 22 are then trimmed and taped side by side in a suitable manner, after which three photographic prints are preferably made of the group. The prints may be conveniently stored in the particular druggist's file for use as and when desired.

23, Fig. 10, designates a "black-form" which may be reproduced from type copy or artist's drawings in a suitable manner. The "black-form" is preferably exactly double the size of the ultimate label to be produced, and is printed in black permanent ink on cardboard of proper size. A blank space 24 is provided to receive one size of "title-design" which, in this instance, is the "title-design" 19, Fig. 6.

25, Fig. 11; 26, Fig. 12; and 27, Fig. 13, designate "black-forms" similar to the form 23, but of progressively smaller size in the respective relationship of fifteen per cent (15%), twenty-two per cent (22%), and thirty-three per cent (33%) reductions relative to the space normally required for a "paste-up title-design" of a relative size shown in Fig. 5.

28, Fig. 14, designates an alternative type of "black-form" having suitable intelligence 29 on one portion thereof and a space 30 on another portion thereof to receive a "title-design" which, in this instance, is of a size corresponding to the "title-design" 20, Fig. 7.

The "title-designs" 19 to 22, and the "black-forms" 23, 25, 26, and 27, together with the "black-form" 28 and another "title-design" 21 are then combined in "paste-up" form to produce "paste-up" forms 31, Fig. 15; 32, Fig. 16; 33, Fig. 17; and 34, Fig. 18, in which the "black-forms," Figs. 10 to 13, have the "title-designs," Figs. 6 to 9, applied to the spaces provided for the "title-designs." Similarly, a "paste-up" form 35, Fig. 19, similar to the "black-form" 28, Fig. 14, is provided with the "title-design" 20 in the space for the design provided therefor, as shown in Fig. 14.

The "paste-up" forms 31 to 35, as well as others similarly formed, may then be placed, as shown in Fig. 20, in rows 37, 38 and 39 on a copy-board 40 of suitable but preferably suction type, as indicated by the suction holes 41. The copy-board may be provided with a suitable pump or the like, not shown, to apply suction to the holes 41 in such a manner as to hold the "paste-up" forms on the board without the necessity of providing a glass cover or similar expedient for so holding the forms in their selected rows. The copy-board may further be supported in longitudinally adjustable relation to a camera on a support 42, and suitable lighting devices 43 and 44 may be provided to illuminate the forms sufficiently to reflect light therefrom onto sensitized film in a manner known in the photographic art.

The group of "paste-up" forms on the copy-board, Fig. 20, is preferably reduced approximately fifty per cent (50%), and the reducing film negative is developed and dried in a conventional manner, "opaque" or the like being applied to the negatives to correct any discrepancies therein.

The method thus far described produces label forms in suitable standard sizes, it having been found that a satisfactory size is approximately 11 by 17 inches. It has further been found that the noted satisfactory size of label form suggests two groups of "paste-ups" that are preferably reduced to 8½ by 11 inches, film size. The copy-board 40, Fig. 20, is therefore preferably masked out at 16½ by 21 inches to produce a film slightly smaller than 8½ by 11 inches, the purpose of which is to allow for a gripper margin on a "masking out glass" 45, Fig. 21.

The masking out glass 45 is preferably of a size suitable for receiving a group of negatives made from the copy-board reduction, just above described, such negatives being arranged to produce half a label form, as indicated at 46, and to substantially fill the unmasked portion 47 of the glass 45, the remainder of the glass being masked out preferably by opaque black paint 48.

It is further preferable to space the negatives on the glass 45, as shown at 49 and 50, to facilitate separating the same, as by cutting after they are printed.

The group of negatives, as shown in Fig. 21, are preferably of such size as to form a sheet suitable for reproduction on a press of preferably offset type, and several of such masking out devices or glasses 45 may be employed for the purpose of setting up label forms in such a manner that the glasses may be moved about at will from one department in a label manufacturing establishment to another, and for the purpose of disassembling the form after a press run has been made.

After the negative form has been set up on the glass masking out device, as shown in Fig. 21, an offset press plate may be made, preferably by the conventional albumin process, the plate then being employed in a standard offset press for printing on suitable gummed paper or the like, not shown, by the conventional offset printing process. The sheets so printed may then be cut apart to produce individual labels 51, Fig. 22; 52, Fig. 23; 53, Fig. 24; 54, Fig. 25; 55, Fig. 26; 56, Fig. 27; 57, Fig. 28; and 58, Fig. 29, it being apparent that the labels 51—58 depend on the negatives that happen to be set up as a form on the masking out glass 45, from which the printing plate is produced. The completed labels so formed may then be sorted and delivered as individual jobs.

Recapitulating, a trimmed "contact print," Fig. 4, taken from a "cello-proof," Fig. 2, and an address line, from a white enamelled proof, Fig. 3, may be arranged on and relative to a "title-design," Fig. 1, to form a "paste-up," Fig. 5. The "paste-up" Fig. 5, is then preferably reduced nine per cent (9%), fifteen per cent (15%), twenty-two per cent (22%), and thirty-three per cent (33%), and prints therefrom are applied to "black-forms," Figs. 10 to 13, to produce completed "paste-up forms," Figs. 15 to 18. The "paste-up forms" are placed on the copy-board, Fig. 20, and reduced fifty per cent (50%) to form negatives, which are arranged on the "masking out devices," Fig. 21. A printing plate is made from the negatives on the masking out glass, and the labels, Figs. 22-29, are reproduced in copies from the printed plate.

It is apparent, therefore, that a rapid, accurate, relatively economical, flexible and efficient method of producing labels, and especially druggist's gummed labels, is provided by the present invention.

What I claim and desire to secure by Letters Patent is:

1. A method of printing gummed labels, said labels comprising a predetermined label form, a predetermined title design, said design bearing an individual legend in color contrasting to the color of said design, including the steps of selecting a label form from a plurality of stock label forms, selecting a title design from a plurality of stock title designs, forming an individual legend in contrasting color to the color of said title design, superimposing said individual legend upon said selected title design to form a titled design, superimposing said titled design on said selected label form, then forming a plate from the result of the antecedent steps and using said plate to print the desired labels.

2. A method of printing gummed labels, said labels comprising a predetermined label form, a predetermined design, said design bearing an individual legend in contrasting color, including the steps of selecting a label from a plurality of stock label forms, selecting a design from a plurality of stock designs, forming an individual legend in contrasting color to the color of said design, said design and said legend being larger than that required for said selected label form, superimposing said individual legend on said selected design to form a titled design, photographing said titled design to form a photographic negative, printing said negative to form a print of a size proportioned to said selected label form, superimposing said print of said titled design upon said selected label form, then forming a plate from the result of said antecedent steps and using said plate to print the desired labels.

3. A method of printing labels in different predetermined sizes having a title design and an individual legend in contrasting color thereon, comprising the steps of selecting a title design from a plurality of stock designs, producing an individual legend in part the same color and in part in contrasting color to the title design, combining the title design and legend parts to form a title design paste-up, selecting label forms of different predetermined sizes, photographically reproducing the title design paste-up in sizes to conform with the different selected sized label forms, mounting the different sized reproductions of the title design on label forms proportioned to the sizes of the title design reproductions to form label paste-ups, photographically reproducing the label paste-ups, forming a printing plate of said last prepared photographic reproductions, and printing the labels from said plate.

ARTHUR C. McCRUM.